United States Patent [19]

Crossley

[11] Patent Number: 4,702,611
[45] Date of Patent: Oct. 27, 1987

[54] CUP PROTECTING MIXER

[76] Inventor: Leonard S. Crossley, 3218 Nebraska Ave., Council Bluffs, Iowa 51501

[21] Appl. No.: 783,489

[22] Filed: Oct. 3, 1985

[51] Int. Cl.⁴ .............................................. B01F 7/16
[52] U.S. Cl. .................................. 366/325; 366/601
[58] Field of Search ............... 366/601, 282, 316, 317, 366/319, 328, 330, 325, 197, 204, 342, 343

[56] References Cited

U.S. PATENT DOCUMENTS

| 271,130 | 1/1883 | Rowe et al. | 366/316 X |
| 1,850,199 | 3/1932 | Bryant | 366/330 |
| 2,007,299 | 7/1935 | Gilbert et al. | 366/197 |
| 2,268,038 | 12/1941 | Knittel | 366/317 X |
| 2,587,135 | 2/1952 | Gafford | 366/204 |
| 2,688,992 | 9/1954 | Russo | 366/328 X |
| 2,911,240 | 11/1959 | Boutros et al. | 366/282 X |
| 2,984,462 | 5/1961 | O'Connor | 366/316 |
| 3,014,229 | 12/1961 | Fassio | 366/601 X |
| 3,385,568 | 5/1968 | Gray | 366/325 X |
| 3,887,169 | 6/1975 | Maynard | 366/331 X |

FOREIGN PATENT DOCUMENTS 60-33054  7/1985  Japan ................................. 366/343

Primary Examiner—Robert R. Mackey
Attorney, Agent, or Firm—Hiram A. Sturges

[57] ABSTRACT

An ice cream product mixer of the type having a housing with an open forward side to receive fragile ice cream product serving cups, a mixing head rotating about a vertical axis and having blades each of which generally incline with respect to the axis. Each blade has a lower end section having an undersurface with a lowermost area which is generally disposed substantially closer to a horizontal plane than is the inclination of the undersurface of parts of each blade which are closer to the axis than the lowermost area, so as to cooperate with low speeds for reducing the danger of rupturing the bottom of a fragile cardboard cup and of ice cream spillage therethrough. With the speed low, the use of high driving power and high blade pitch makes possible the rapid mixing of hard ingredients into stiff ice cream in the cups, the outer surfaces of the blades being blunt to reduce danger of puncturing the sides of the fragile cups.

13 Claims, 4 Drawing Figures

CUP PROTECTING MIXER

BACKGROUND OF THE INVENTION

In recent years the retail soft ice cream stands have lost a tremendous amount of business to newly starting up hard ice cream retail stands and to super-market sales of packaged factory mixed flavored hard ice cream.

This is partly because the factory mixed ice cream has been sold in an increasingly great variety of flavors even as many as thirty-one flavors with admixed ingredients such as nuts, chocolate chips, candies, fruits and cookie chips.

The usffering retail soft ice cream stands have had mixers with which to mix such ingredients into their own soft products, but such mixers have not been efficient enough to provide a sufficiently speedy mixing. This causes excessive labor cost overhead and long customer "waits" during the slow mixing. So soft ice cream stands have not been able to offer the great variety of ingredients that factory mixing has offered.

An objective hereof is to provide a patron of a soft ice cream stand with the privelege of being his own "ice cream chef," placing an order for a product containing ingredients from a generous list as made affordable by the new low labor cost speedy mixing hereof.

Another objective is to provide an efficient mixer useful with ice cream of any butterfat content, low or high.

The public will like the economic possibilities hereof:
(1) The best ice cream is fresh from the freezer, much superior in flavor to ice cream factory made and stored.
(2) Such fresh "soft serve" ice cream is also less cold than hard package ice cream and hence is easier on the taste buds.

This invention is in the field of mixing heads for mixers or blenders. In the prior art, a superior mixing head has been greatly needed so as to provide good mixing using thick ice cream or ice milk at low initial mixing head cost and with good paper cup protection.

The public desires an ice cream product of great consistency so as to stand up well on an ice cream cone. The most healthy kind of product is a product with low butter fat, such as is popularly known as "soft-serve". Heretofore it has not been practical to mix nuts, chocolate chips, or candies into "soft serve" ice cream.

The problem is that if one of the popular types of mixers is used, operating at 18,000 RPM, the common mixing head tends to cavitate, meaning that the mixing head makes its own cavity in the ice cream and then no more mixing occurs because such a mixing head simply spins in its own cavity.

It is an object of this invention, therefore, to provide a mixing head with blades with a large offset which will move the ice cream and thereby providing a good mixing of the products.

Another object is to provide a mixing head which will accomplish this good mixing while being rotated t far lesser speed, such as 250 RPM. The advantage is that the sides of a paper cup will not be cut by the slower blades in ordinary use, which is a problem common to the high-speed mixers used at ice cream stands today.

In the prior art retail "soft-serve" ice cream stands, flavor could not be added after the ice cream is taken from the freezer and maintain good consistency because there has been no adequate way of blending the flavor with the small equipment used at retail level compared to large factory-mixed ice cream because excessive amounts of time have been needed for the mixing. Time becomes increasingly important with rising labor costs.

For these various reasons, soft-serve ice cream stands have served only flavors already in their machine, usually vanilla or chocolate.

An important distinction must be made between factory-made ice cream in which the mixing is easily done because the ice cream is much more fluid, being at a temperature of about 26 degrees Fahrenheit. This is contrasted with the material coming out of a soft-serve machine which is much colder and more thick, being about 18-20 degrees Fahrenheit. Being more thick, it is hard to blend ingredients into it. It is important to realize that the product of a retail soft-serve machine is generally immediately consumed. For these reasons, customers at soft-serve stands have not had the privilege which is the object of this invention to provide, namely, the privilege of being able to order any special flavor that he might desire fresh from the soft-server, because even the small ice cream stand, with this invention for blending thoroughly, would be fast enough to compete with other stands that have only hard frozen ice cream blended at a factory. The reduced total time using the head hereof makes this personalized custom-blending affordable even at today's high labor costs.

Safety is also important. In the prior art, when an operator's finger accidentally comes in contact with a side of a rotating mixing head, the finger can be injured.

An object of this invention, therefore, is to provide a mixing head having blades with rounded forward corners which will push an operator's finger away from the mixing head for greater safety.

A further object is to provide these same rounded corners so that the mixing head hereof, as compared to prior art heads, has a much reduced tendency to slice into sides of a paper ice cream cup, causing out-spillage of the product. This is important because cups and product are costly, and because the labor of cleaning soiled operator's clothes is also costly.

It is possible with thermoplastic injection-molding to make mixing heads of low-cost and of one-piece construction, but the tooling costs for such manufacture would be excessive.

It is an object hereof to provide a mixing head which can be made from one single blow of a punch press at a die cost of about $1,000, as compared with about a $10,000 die cost for plastic injection molding.

Another prior art problem with mixers rotating at 18,000 RPM is that the heat generated by friction, melts the ice cream so that it is not as thick as desired. It is, therefore, an objective hereof to provide a mixing head which can be rotated at much lower speeds, generating much less frictional heat.

Another disadvantage of such high-speed mixing heads having the cavitation problem and the slow mixing caused thereby is that a worker can be required to be involved in much human physical exertion in moving the ice cream cup up and down on the mixing head which, during working hours, is very tiring.

So it is an object hereof to provide superior mixing accomplished by the head itself, rather than human physical exertion.

An objective is to provide a head which speedily mixes many ingredients into soft-serve ice creams.

Ice cream mixers, for ice cream stand usage, customarily are provided with housing receiving the cup and so this invention is to be distinguished from mixers having no housings and not intended for paper cup reception at ice-cream stands.

Some prior art mixing heads have the tendency to throw an ingredient with great force, such as to throw a nugget of chocolate candy through the side of a paper cup, causing leakage. This is because such mixing heads rotate at very high speeds. It is an object hereof to eliminate this problem by providing a mixing head which will eliminate this problem by rotating at much lesser speed, such as at about 250 RPM.

The mixer hereof has a variable speed motor so that the RPM can be increased from 0 to 250 RPM level used for mixing and up to about 1800 RPM, as used after mixing and for the purpose of spinning the product off of the mixing head so that the mixer is substantially self-cleaning so that ingredients of a previous ice cream mixture need not be wiped off to prevent flavor carry-over and discoloring of a mixture later made.

Another objective is to make less work for the operator during mixing. Much less human movement of the cup with respect to the mixing head is required because of the greater stirring capability. This lesser reduced cup movement also further protects the cup from damaging contact with the mixing head.

An objective is to provide a mixing head having blades, the tips of which are bent into substantially horizontal position so that they would not tend to sharply abrade the bottom of the paper cup, to prevent it from becoming ruptured.

In the prior art, the most popular mixer used in retail mixing of individual servings has been a mixer of about one-seventh Horsepower and having a 3-speed selection at 18,000, 16,000 and 13,000 RPM.

An object hereof is to vastly reduce the speed so as to greatly reduce the potential damage that a high-speed head can do to a cardboard cup, since it has been discovered that the greater power and greater inclination or pitch of the blades of the present invention does not damage a cup as much as does great speed, and especially as does the combination of prior art great speed and cup-damaging mixing head shape.

DESCRIPTION OF THE PREFERRED EMBODIMENT

Figure 1:
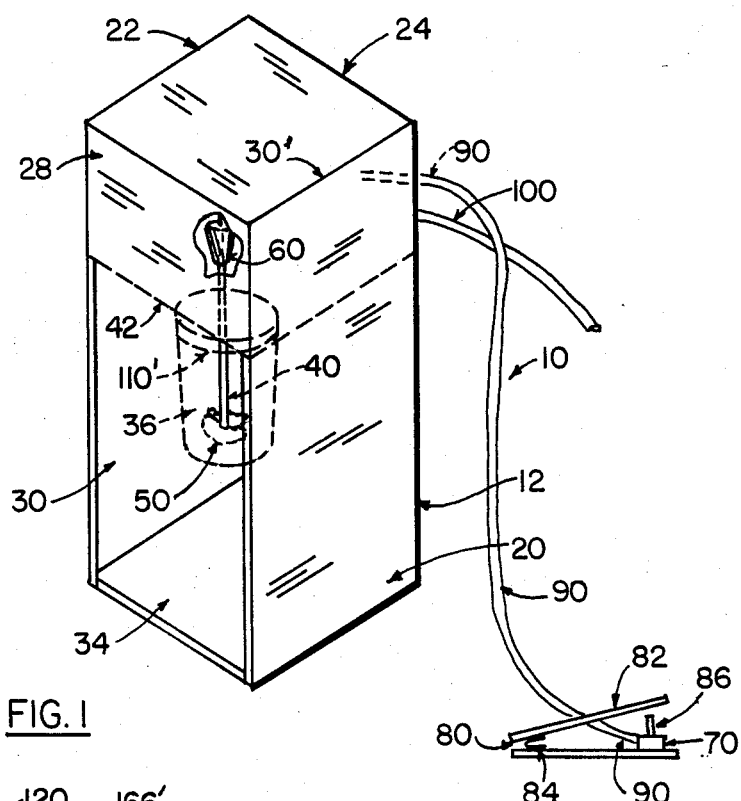
FIG. 1 is a perspective view of the ice cream mixer of this invention.

This invention is a mixer generally indicated at 10 in FIG. 1. The mixer has a housing 12 having closed sides at its right side 20, its left side 22, and its rearward side 24. The forward side of the housing 12 is closed by a forward wall 28 extending part of the way downwardly on the forward side from the closed top wall 30' of the housing. The housing also has a closed bottom wall 34.

A larger part of the forward side of the housing has an opening 30 through which a cardboard cup indicated in dotted lines at 36 can be inserted so as to become received on a rotating shaft 40 of the mixer, which latter has a mixing head 50 at its lower end and attached thereto.

Behind the upper forward wall 28 and in an area above the lower edge 42 thereof is a driving mechanism 60 attached to the upper end of the shaft 40 and driving it.

The driving mechanism 60 is mounted on the housing 12 and has an AC and DC series wound gear motor to be operated at variable speeds by rheostat 70 of a foot pedal speed control assembly generally indicated at 80 and having a foot pedal 82 normally upheld by a spring 84, but when depressed, will operate the rheostat 70 to which it is connected by shaft 86. The rheostat 70 is itself connected to a cord 90 which extends through the backside 24 of the housing 12 in an upper area thereof and extends to a connection not shown to the drive mechanism 60 which also has nother cord 100 extending from it and out the backside of the housing 12 for connections to a power source which can be a 110-volt AC circuit.

The rheostat 70 can be of a coiled wire type or else a solid state rheostat substitute.

The foot pedal will be found to be a great advantage compared with the manual controls on prior art mixers because both of the operator's hands are free. One hand can hold the lower end of the cup 36 and the other hand can hold in place a metal collar 110' which is customarily inserted into the upper end of the cup so that the cup can be filled to a greater extent.

Figure 3:
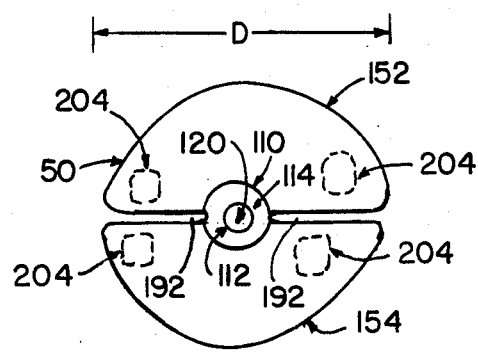
FIG. 3 is a bottom plan view of the mixing head of this invention.
Figure 4:
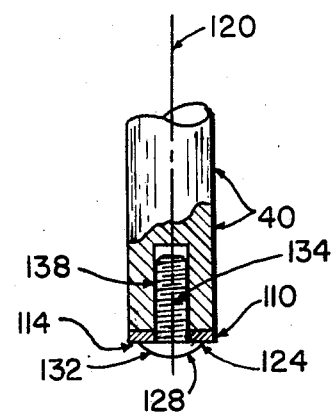
FIG. 4 shows a center portion of the mixing head with all other parts broken away showing in detail the way a round-headed bolt is welded all the way around the head of the bolt to the central portion of the head of the mixer.

The mixing head 50 can be used for mixing together two or more substances of many kinds and has central hub portion generally indicated at 110 in FIG. 4 surrounding a hole 112. The hub portion 110 is circular and horizontal on its upper and lower sides and surrounds the circular hole 112. The central hub portion 110 is symmetrical about an axis 120 extending through the center of the hole 112. The hub portion can be considered to have a first side 113 which is normally the top side and a second side 114 which is shown in FIG. 3.

In FIG. 4 there can be seen welding 124 attaching a bolt 128 to the head portion 110. The bolt 128 has a bolthead 132 and a threaded shank 134. The head 132 presses against the lower side of the head portion 110 and is also secured to it by the welding 124, which latter also fills any crevice between the bolthead 132 and the head portion 10 so as to prevent bacteria buildup in the crevice that would otherwise exist.

The bolthead 132 is threadedly received in a threaded recess 138 in the bottom end of the shaft 40.

A plurality of blades are attached to the hub portion 110 and they are arranged sequentially around the axis 120 as seen at times when one is looking at the mixing head 50 along the axis 120 from the first axial side or top side of the hub 110.

Figure 2:
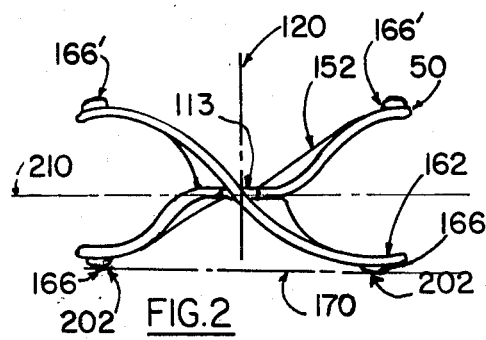
FIG. 2 is a frontal elevation of the mixing head of this invention.

A 2-bladed mixing head is seen at 50 in FIGS. 1, 2, and 3, has blades 152 and 154, each of which are disposed at an inclination of approximately 70 degrees with respect to the axis 120, as seen in frontal elevation in FIG. 2. Also in FIG. 2 it can be seen that each blade has a lower end section 162 which latter has a lowermost surface area 166 which is disposed much closer to being in parallelism with a plane 170 extending through the lowermost surface areas 166 than the general inclinations of the blades themselves are.

In some uses, such as hand-held mixing units, of the type in which the operator holds the motor in his hand while the mixer head is in the container, then mixing heads of maximum horizontal dimension of 5 inches or less can be useful and such heads made in accordance with the principles hereof, would do far less damage to the plastic containers of the food industry because of their shape and because of the much lesser speed of rotation.

When seen in frontal elevation in FIG. 2, the blades criss-cross one another and are transverse to one another.

In FIGS. 3, each blade is seen to be separated from an adjacent blade by a pair of slots 192 which extend along a radius from the axis 120 from the outer edges of the blades inwardly into the hub portion 110 itself, which latter has horizontal upper and lower surfaces or sides 113 and 114. The outer end section of each blade 162 is itself disposed so as to be much closer to parallelism with the plane 170 than is the general length of the inclined respective blade. The outer end portions 162 are parallel with the plane 170.

Each blade has a protrusion or convex area on its underside, as seen at 202.

On the upper side of each blade at the convex areas 202 are concave areas 204 whereby the entire blade can be die-stamped in one blow from the top from a piece of circular stainless steel. Upper portions of each blade which are above a horizontal plane 210 extending horizontally through the hub are symmetrical with blade portions therebeneath. Thus in production, either side of the blade can be faced upwardly.

The maximum horizontal dimension of the blade is seen along a narrow plane D in FIG. 3. The dimension D can be 3 inches to make a size for mixing single ice cream serving portions but preferably being about two and one-fourth inches.

When large batches of dry milk are being mixed with water, blades of 4 and 5 inches can be useful and used without even greater power than the single serving mixing size of the motor which is two-fifths Horsepower and a dimension D of preferably two and one-fourth inches.

I claim:

1. A mixer for mixing solid ingredients into cold and stiff ice cream, said mixer having a frame, said frame being open on its forward side to receive a cup, a mixing head disposed rearwardly of said open forward side, said mixing heat rotating about a substantially vertical axis, said head having a central portion surrounding said axis, a shaft projecting upwardly from and fixed to said central portion, a driving means mounted on said frame and supporting and driving said shaft for rotation about said axis, a plurality of blades attached to said central portion, said blades criss-crossing one another and being transverse to one another in frontal elevation and projecting from said central portion and away from said axis above and below a horizontal plane at a right angle to said axis through said central portion and arranged sequentially around said axis, each of said blades when seen from a direction at a right angle to said axis being generally inclinedly disposed with respect to said axis, each said blade having a lower end section having a lowermost surface area which latter is substantially entirely disposed at an inclination substantially closer to the horizontal than is the general inclination of portions of the underside of the respective blade which are disposed upwardly thereof and on the underside of a horizontal plane through the center of said head and disposed inwardly toward said axis therefrom whereby said blades do not tend to damage the bottom of a cup when the latter is engaged thereby, and operator-controllable speed control means correlated with said driving means whereby said head can be driven at multiple speeds, said blades having blunt outer ends for reducing the danger of puncturing the sides of a cup.

2. The mixer of claim 1 wherein each of said blades has its lower end section provided with a downwardly protruding portion having a convex lower surface part, part of said lower surface defining said lowermost surface area of the respective blade, the lowermost part of said convex lower surface being surrounded on all sides by material parts of said blade.

3. The mixer of claim 2 wherein that portion of said lower section of each said blade which is convex on its underside being concave on its upper side for ease of die-stamping in production, said each blade being free of perforation in the area of said downwardly protruding portion.

4. The mixer of claim 1 wherein said operator controllable speed control means comprises a foot pedal speed control assembly connected to said driving means, the foot pedal speed control assembly having a foot pedal locatable on the fllor at a time when said mixing head is at a level for easy reach by an operator's hands, said foot pedal speed control assembly and said drive means being capable of varying the speed of rotation of said shaft for the operation of said mixer in a manner such that the operator's hands are free from speed control duties and yet speed can be varied from a lower speed for mixing to a much higher speed used t the completion of mixing.

5. The mixer of claim 1 in which said driving means comprises a three-tenths horsepower motor.

6. The mixer of claim 1 in which said head is less than 3 inches in maximum horizontal dimension for mixing individual ice cream product servings for one person.

7. The mixer of claim 1 in which said head is less than 5 inches in maximum horizontal dimension.

8. The mixer of claim 1 wherein said lowermost surface portion of each said blade is free of any offset portion disposed closely inwardly of said lower end section.

9. The mixer of claim 1 wherein said from comprises a closed rearward wall extending across the rearward side of and spaced from said mixing head, a partial front wall and spaced side walls which form said opening which is open in an area extending downwardly from said mixing head as seen in frontal elevation so that a cup can be moved from the forward side of said housing rearwardly and upwardly onto said mixing head.

10. The mixer of claim 9 wherein said head and said shaft define a head and shaft assembly, the lower end of said assembly being disposed substantially midway between the top and the bottom of said cup opening for the reception of a cup onto said shaft.

11. The mixer of claim 1 wherein said blades are substantially of uniform thickness so as to adapt them to formation by die-stamping, said blades and control portion being substantially formed of one piece of metal by a die-stamping blow.

12. The mixer of claim 1 wherein said blades each have a radial dimension extending radially from said axis, said blades being disconnected along the majority of their radial dimensions beginning at the outer ends thereof.

13. The mixer of claim 1 wherein said speed control means is capable of driving said head at speeds of less than 500 r.p.m.

* * * * *